US007517020B2

(12) United States Patent
Yokota

(10) Patent No.: US 7,517,020 B2
(45) Date of Patent: Apr. 14, 2009

(54) SEAT HEIGHT ADJUSTMENT MECHANISM

(75) Inventor: Masaaki Yokota, Tokyo (JP)

(73) Assignee: Tachi-S Co., Ltd., Tokyo (JP)

( * ) Notice: Subject to any disclaimer, the term of this patent is extended or adjusted under 35 U.S.C. 154(b) by 0 days.

(21) Appl. No.: 11/761,716

(22) Filed: Jun. 12, 2007

(65) Prior Publication Data

US 2008/0007104 A1    Jan. 10, 2008

(51) Int. Cl.
*B60N 2/16*    (2006.01)
*F16M 13/00*    (2006.01)

(52) U.S. Cl. ................... 297/344.15; 248/421

(58) Field of Classification Search ............ 297/344.15; 248/421

See application file for complete search history.

(56) References Cited

U.S. PATENT DOCUMENTS

| 4,556,185 | A | * | 12/1985 | Takagi | ................. | 297/344.15 X |
| 4,993,678 | A | * | 2/1991 | Easter | ................. | 297/344.15 X |
| 5,676,424 | A | * | 10/1997 | Winkelhake | ........ | 297/344.15 X |
| 5,863,098 | A | * | 1/1999 | Kojima et al. | .......... | 297/344.15 |
| 5,882,061 | A | * | 3/1999 | Guillouet | ............ | 297/344.15 X |
| 6,264,275 | B1 | * | 7/2001 | Frohnhaus et al. | .. | 297/344.15 X |
| 6,276,650 | B1 | * | 8/2001 | Kojima et al. | ............ | 248/421 X |
| 6,290,198 | B1 | * | 9/2001 | Kojima et al. | ........ | 297/344.15 X |
| 6,464,193 | B1 | * | 10/2002 | Nemoto | ............... | 297/344.15 X |
| 6,484,995 | B1 | * | 11/2002 | Nemoto | ....................... | 248/421 |
| 6,488,337 | B1 | * | 12/2002 | De Voss et al. | ...... | 297/344.15 X |
| 6,502,798 | B1 | * | 1/2003 | Frohnhaus et al. | .. | 297/344.15 X |
| 6,505,888 | B1 | * | 1/2003 | Teufel et al. | ........ | 297/344.15 X |
| 6,533,351 | B2 | * | 3/2003 | Deptolla | ............. | 297/344.15 X |
| 6,666,423 | B1 | * | 12/2003 | Nemoto | ............. | 297/344.15 X |
| 6,902,234 | B2 | * | 6/2005 | Becker et al. | ....... | 297/344.15 X |
| 7,066,540 | B2 | * | 6/2006 | Minai et al. | ............ | 297/344.15 |
| 7,077,471 | B2 | * | 7/2006 | Schumann et al. | ..... | 297/344.15 |
| 7,243,992 | B2 | * | 7/2007 | Canteleux et al. | ..... | 297/216.1 X |
| 7,278,686 | B2 | * | 10/2007 | Yoshida | .............. | 297/344.15 X |
| 7,316,454 | B2 | * | 1/2008 | Yoshida | .............. | 297/344.15 X |
| 7,338,118 | B2 | * | 3/2008 | Ichikawa et al. | .... | 297/344.15 X |
| 2006/0061176 | A1 | * | 3/2006 | Sakai et al. | ............. | 297/344.15 |
| 2007/0194613 | A1 | * | 8/2007 | Kojima | ................... | 297/344.15 |

* cited by examiner

*Primary Examiner*—Rodney B. White
(74) *Attorney, Agent, or Firm*—Browdy and Neimark, PLLC

(57) ABSTRACT

A seat height adjustment mechanism is provided, which includes a backward link element, a ratchet-type drive mechanism operable by an operating lever to cause vertical movement of the backward link element to adjust height of seat, and a locking mechanism. The backward link element is normally locked by the locking mechanism to reinforce the backward link element itself. When the operating lever is rotated during an idle stroke ($\Delta S$) inherently given in the ratchet-type drive mechanism, the locking mechanism is actuated to unlock the backward link element, thereby allowing the backward link element to be vertically displaceable through operation of the ratchet-type drive mechanism by further rotation of the operating lever.

8 Claims, 4 Drawing Sheets

SEAT HEIGHT ADJUSTMENT MECHANISM

BACKGROUND OF THE INVENTION

1. Field of the Invention

The present invention relates to a seat height adjustment mechanism provided in a vehicle seat, which is operable to adjustably raise or lower the seat to a desired level. In particular, the invention is directed to the height adjustment mechanism of this kind which is designed to avoid dangerous factor in the case of rear-end collision (i.e. bump from behind).

2. Description of Prior Art

A seat height adjustment mechanism (or the so-called "seat lifter mechanism") is provided in an automotive or vehicle seat in order to enable a user to adjustably set a height of the seat to his or her desired level. In general, the height adjustment mechanism comprises a pair of forward link members and a pair of backward link members, which are pivotally connected between a seat cushion frame and a seat riser member provided on the side of floor, and also comprises an operating lever for causing vertical movement of those forward and backward link members and a brake unit adapted for limiting downward movement of the link members. For example, the operating lever is operatively connected with the backward link members, so that operation of the operating lever causes vertical displacement of one of the two backward link members, which in turn causes vertical displacement of all other remaining link members. Hence, a user can adjustably raise or lower the seat to a desired level.

In most of the foregoing kinds conventional seat height adjustment mechanisms, the brake unit stated above is provided to only one of the forward and backward link members, which means that a braking effect is only acted on one of the link members from the brake unit, and therefore, all other remaining forward and backward link members are not given any braking effect and thus free to rotate vertically.

Now, if a vehicle with a seat having the foregoing kind of seat height adjustment mechanism is bumped from behind by another vehicle (that is, if a rear-end collision occurs), an excessive great load (a great impact load) is applied from a seat occupant on the seat, under a backward inertia of that seat occupant. In that case, such excessive great load is directly applied to the afore-sated link members without the brake unit, as a result of which, those particular link members are bent and twisted relative to the afore-stated backward link member provided with the brake unit, which may creates the problem that the seat height adjustment mechanism on a whole will be twisted and deformed downwardly and that a serious damage will be given to the seat occupant, or particularly a neck portion of the seat occupant will be damaged.

Recently, to meet safety demands including the above-stated problem, the backward link member of seat height adjustment mechanism is reinforced by increasing the thickness thereof to withstand the afore-said excessive great load. But, such increase of thickness of the link member undesirably results in increase of weight of the seat height adjustment mechanism as well as in increase of costs involved.

As disclosed for example from the Japanese Laid-Open Patent Publication No. 2004-210030, there is known a seat height adjustment mechanism of the type having a lock means which operates to quickly lock a backward link member responsive to a rear-end collision. According to this prior art, the lock means is provided to forward and backward link members which are not provided with a brake unit, and an inwardly toothed hole is formed in the backward link member, and an engagement hook piece is rotatably provided to a seat cushion frame so as to be engaged with or disengaged from the inwardly toothed hole. Also, an actuator arm is connected with the engagement hook piece and movable responsive to a seat belt being stretched by a forward initial displacement of a seat occupant strained by that seat belt, in the case of rear-end collision. Normally, the engagement hook piece is disengaged from the inwardly toothed hole, and therefore, the backward link member is unlocked and free to rotate vertically to permit adjustment in height of the seat. When the rear-end collision occurs, the seat belt is stretched and the actuator arm is quickly moved responsive to such stretching of seat belt to thereby cause the engagement hook piece to rotate toward the inwardly toothed hole of the backward link member and engage the same, so that the backward link member is immediately locked against movement during the rear-end collision. Accordingly, such locking action serves to protect the backward link member (not provided with the brake unit) against deformation by an excessive great load applied to that particular backward link member, thereby avoiding twisting and downward deformation of the seat height mechanism on a whole.

However, the above-described conventional seat height adjustment mechanism is found defective in that, if the load applied from the seat occupant to the seat belt is relatively weak, the seat belt is not sufficiently stretched, and the actuator link will not be moved to cause engagement of the engagement hook piece with the inwardly toothed hole, in which case, the backward link member may not be locked and deformed. Hence, with this conventional mechanism, it is technically difficult to insure to lock the backward link member, and it is likely that the seat height adjustment mechanism may be deformed by actual rear-end collision to give a damage to the seat occupant.

SUMMARY OF THE INVENTION

In view of the above-stated drawbacks, it is a purpose of the present invention to provide an improved height adjustment mechanism in vehicle seat, which insures that a backward link element thereof is normally in a locked state to thereby prevent the height adjustment mechanism against deformation in the case of rear-end collision, without being influenced by a degree of the backward inertia described above.

In order to achieve such purpose, a seat height adjustment mechanism in accordance with the present invention is basically comprised of:

- a forward link element pivotally connected between a forward region of seat cushion frame and a forward region of base member;
- a backward link element pivotally connected between a backward region of seat cushion frame and a backward region of said base member;
- a ratchet-type drive means operatively connected with the backward link element and operable to cause vertical rotation of the backward link element towards and away from the base member, the ratchet-type drive means including an operating lever normally set at a neutral inoperative position, the operating lever being movable in one of a first direction and a second direction relative to the neutral inoperative position to thereby cause the afore-said vertical rotation of the backward link element;
- the ratchet-type drive means being of such a type wherein an idle stroke is inevitably given with respect to one stroke of the operating lever in the afore-said one of the first and second directions, and, during said idle stroke, movement of the operating lever in any of the first and second directions is inoperative to the ratchet-type drive means; and a locking mechanism including:

a gear element fixed to the backward link element;

a latch element rotatably connected with the base member;

an actuator link rotatably connected with the base member; the actuator link having an operative connection with the latch element, and also having an operative connection with the operating lever via a transmission element; and a biasing means for biasing the latch element to meshed engagement with the gear element, thereby normally locking and retaining the backward link element against rotation, with such an arrangement that, when the operating lever is moved in the afore-said one of the first and second directions during the idle stroke, a corresponding force of the thus-moved operating lever is transmitted via the transmission element to the actuator link which is in turn rotated to cause simultaneous rotation of the latch element, so that that particular latch element is disengaged from the gear element during the idle stroke, thereby placing the backward link member in unlocked state.

Preferably, one of the latch element and actuator link may have a guide pin fixedly provided therein, whereas another of the latch element and actuator link may have a guide hole formed therein, such that the guide pin is slidably inserted in said guide hole, thereby establishing the operative connection between the latch element and the actuator link.

Other various features and advantages of the present invention will become apparent from reading of the description, hereinafter, with reference to the annexed drawings.

DETAILED DESCRIPTION OF PREFERRED EMBODIMENT OF THE INVENTION

Referring to FIG. 1 to FIG. 9(C), there is illustrated an exemplary embodiment of seat height adjustment mechanism in a vehicle seat, as generally designated by (10), in accordance with the present invention. While not designated by numeral, FIGS. 1 and 2 substantially indicate, by a one-dot chain lines and solid lines, a whole of a vehicle seat in which the seat height adjustment mechanism (10) is provided. Designation (12a) and (12) respectively denote a seat cushion of the vehicle seat and a seat cushion frame provided in that seat cushion. Designation (13) denotes a seat back of the vehicle seat.

The vehicle seat also includes a pair of left-side and right-side seat riser members (14L) (14R) which are adapted for fixation on a floor (not shown). Such seat riser members are not imitative, but, any suitable base frame or any known seat slide device may be used, instead thereof, as required, insofar as it may be fixed on the floor as a base on which the vehicle seat and the seat height adjustment mechanism (10) are properly mounted.

It is noted that the wording, "forward" or "forwardly", refers to a side (FW) forwardly of the vehicle seat, whereas the wording, "backward/rearward" or "backwardly/rearwardly", hereinafter "backward" or "backwardly" only refers to a side (BW) backwardly of the seat.

As constituent elements of the seat height adjustment mechanism (10), there are provided a pair of left-side and right-side forward link members (16F-L) (16F-R) and a pair of left-side and right-side backward link members (16B-L) (16B-R). The left-side forward link member (16F-L) is at a lower end thereof pivotally connected with a forward end portion of the left-side seat riser member (14L), while being at an upper end thereof pivotally connected with a forward region of the seat cushion frame (12). Likewise, the right-side forward link member (16F-R) is at a lower end thereof pivotally connected with a forward end portion of the right side seat riser member (14R), while being at an upper end thereof pivotally connected with the forward region of seat cushion frame (12). On the other hand, the left-side backward/rear link member (16B-L), hereinafter backward link member only, is at a lower end thereof pivotally connected with a backward end portion of the left-side seat riser member (14L), while being at an upper end thereof pivotally connected with a backward region of the seat cushion frame (12). Likewise, the right-side backward link member (16B-R) is at a lower end thereof pivotally connected with a backward end portion of the right-side seat riser member (14R), while being at an upper end thereof pivotally connected with the backward region of seat cushion frame (12).

Figure 1:
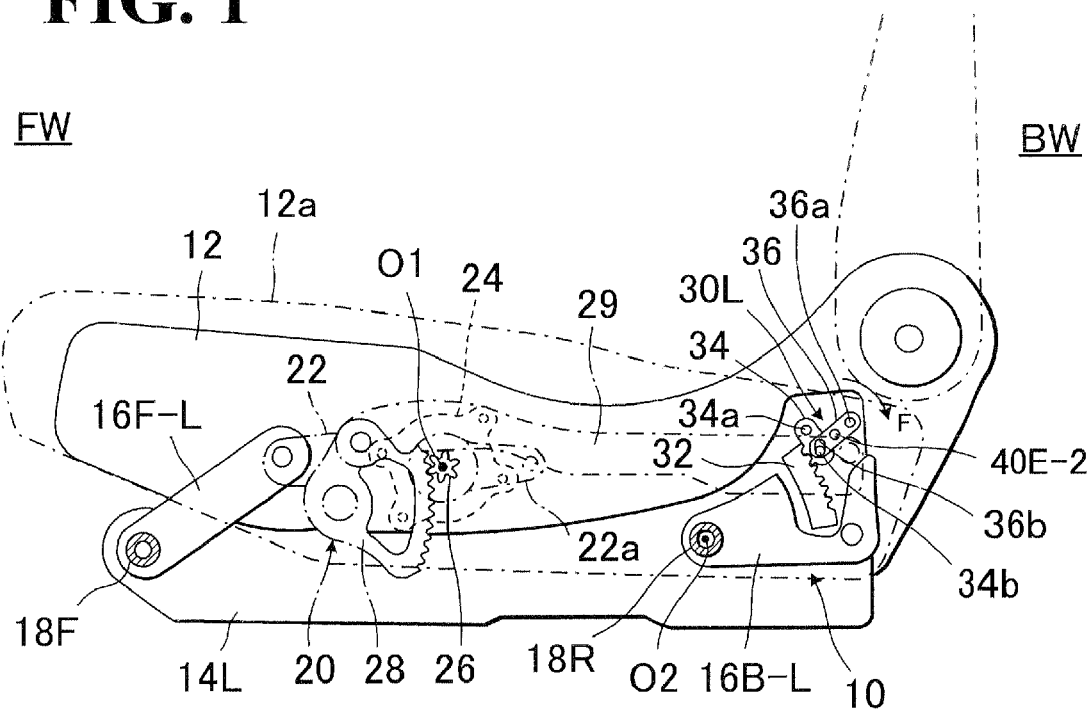
FIG. 1 is a partly broken schematic front view showing a left-side principal part of seat height adjustment mechanism in accordance with the present invention.

In the illustrative seat height adjustment mechanism (10), as shown in FIG. 1, a known ratchet-type drive mechanism (20) is only provided to the left side of the vehicle seat where there lie the left-side forward and backward link members (16F-L) (16B-L). The ratchet-type drive mechanism (20) comprises: an operating lever (22) provided with a known ratchet-type lever mechanism (not shown); a brake unit (24); a pinion gear (26); a sector gear (28); and a connecting link (29).

As illustrated, the operating lever (22) includes a drive shaft (at 01) which is operatively connected with the brake unit (24) as well as with the pinion gear (26). Pinion gear (26)

is meshed with the sector gear (28). The connecting link (29) is at the forward end thereof pivotally connected with the sector gear (28), while being pivotally connected with the left-side backward link member (16B-L) at the backward end thereof.

Figure 2:
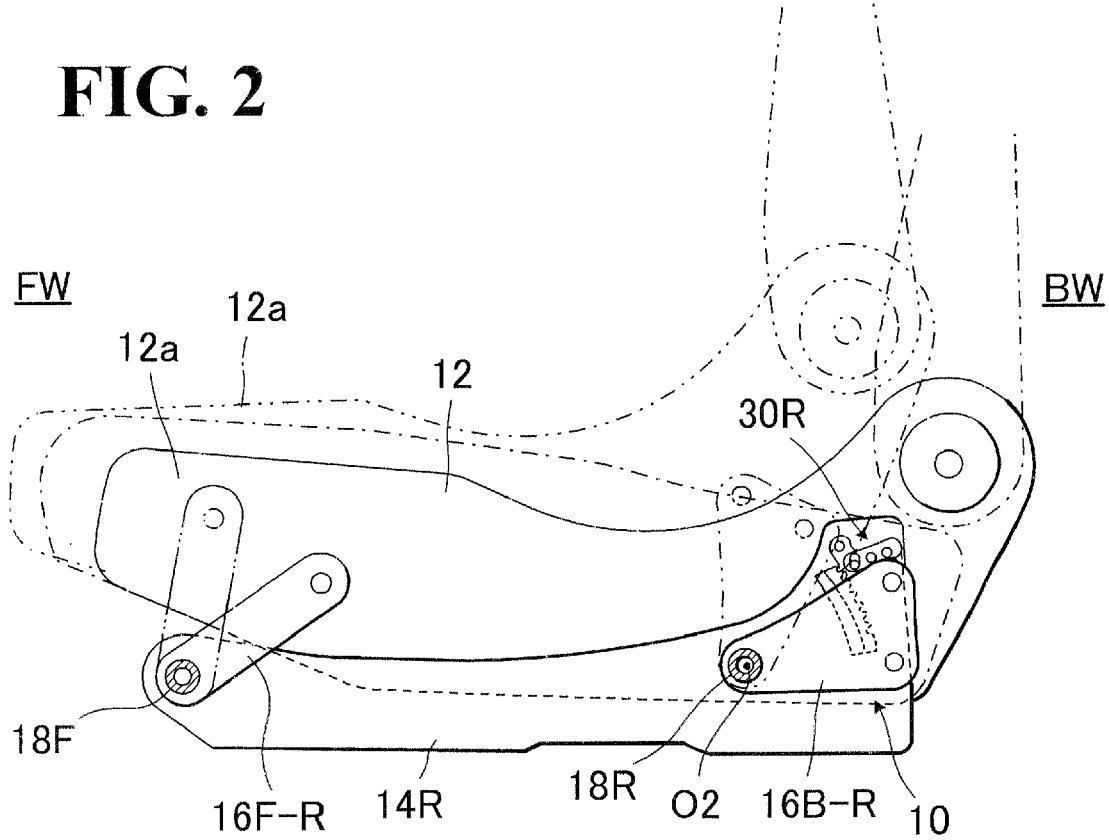
FIG. 2 is partly broken schematic front view showing a right-side principal part of the seat height adjustment mechanism, which also explanatorily shows a vertical movement of seat.

As can be seen in FIGS. 1 and 2, the left-side and right-side forward link members (16F-L) (16F-R) are connected integrally with each other via a forward connecting rod (18F), whereas the left-side and right-side backward link members (16B-L) (16B-R) are connected integrally with each other via a backward connecting rod (18R).

While not shown, according to the ratchet-type drive mechanism (20), a ratchet-type lever mechanism is provided in the operating lever (22). In brief, the ratchet-type lever mechanism comprises: a pair of ratchet pawls rotatably provided therein, which are operatively connected with that operating lever (22); and a pair of ratchet gears rotatably provided therein, each of which is operatively connected with the afore-said drive shaft of the operating lever (22). One of the two ratchet pawls may be selectively engaged with corresponding one of the two ratchet gears by rotation of the operating lever (22). For example, upward rotation of the operating lever (22) causes one of the two ratchet pawls to engage one of the two ratchet gears, thereby resulting in upward and forward rotation of both two backward link members (16B-L) (16B-R), which causes simultaneous upward and forward rotation of both two forward link members (16F-L) (16F-R) as well. In that manner, the seat cushion (12a) or the seat may be displaced upwardly from the lowest position shown in FIG. 1 to a desired level. But, this ratchet-type lever mechanism or the ratchet-type drive mechanism (20) itself is not the subject matter of the present invention. For detailed information thereon, reference may be made to the Japanese Laid-Open Patent Publication No. 2001-088589 and the U.S. Pat. No. 6,484,995, for instance. Any further description on this sort of mechanism is therefore omitted. What is only concerned by the present invention with such conventional mechanism is a space inevitably and inherently given between the ratchet pawls and ratchet gears, which actually provides a small amount of inoperative stroke (hereinafter, an idle stroke) in one stroke of the operating lever (22) in either of upward and downward directions, as will be explained later. In accordance with the present invention, a pair of let-side and right-side locking mechanisms (30R) (30L) are provided to the respective afore-said pair of left-side and right-side backward link members (16B-L) (16B-R) as well as to the respective two backward end portions of the afore-said pair of left-side and right-side seat riser members (14L) (14R).

As stated above, the ratchet-type drive mechanism (20) used in the seat height adjustment mechanism (10) is inherently and inevitably provided with an idle stroke in one stroke of the operating lever (22) in either of upward and downward directions. (Such idle stroke is designated by (∠S) in FIG. 9(A).) Namely, although not shown, in this particular ratchet-type drive mechanism, it is well known that, when an operating lever is in a neutral inoperative position, a pair of ratchet pawls (not shown) are disengaged from the ratchet gear or the respective pair of ratchet gears (not shown), so that a space is inevitably given between the ratchet pawl and the ratchet gear, as readily understandable from the above-noted prior art literature. Due to such space, even when the operating lever (22) is rotated in either of upward and downward directions, the operating lever (22) remains inoperative or idle to the seat height adjustment mechanism (10) until the lever (22) reaches a given point where one of the two ratchet pawls is engaged with corresponding one of the two ratchet gears. Consequently, as can be seen from FIG. 9(A), an idle stroke (∠S) is inevitably given in one stroke (S) of the operating lever (22) in either of upward direction (toward an upper limit U) and downward direction (toward a lower limit L), in relation to the neutral position (N).

In the present invention, the previously stated two locking mechanisms (30R) (30L) use the foregoing idle strokes (∠S) as a means for unlocking the backward link members (16B-L) (16B-R), while normally acting to insure locking those two link members against movement to withstand an excessive great load applied thereto, as will be described later.

Figure 3:
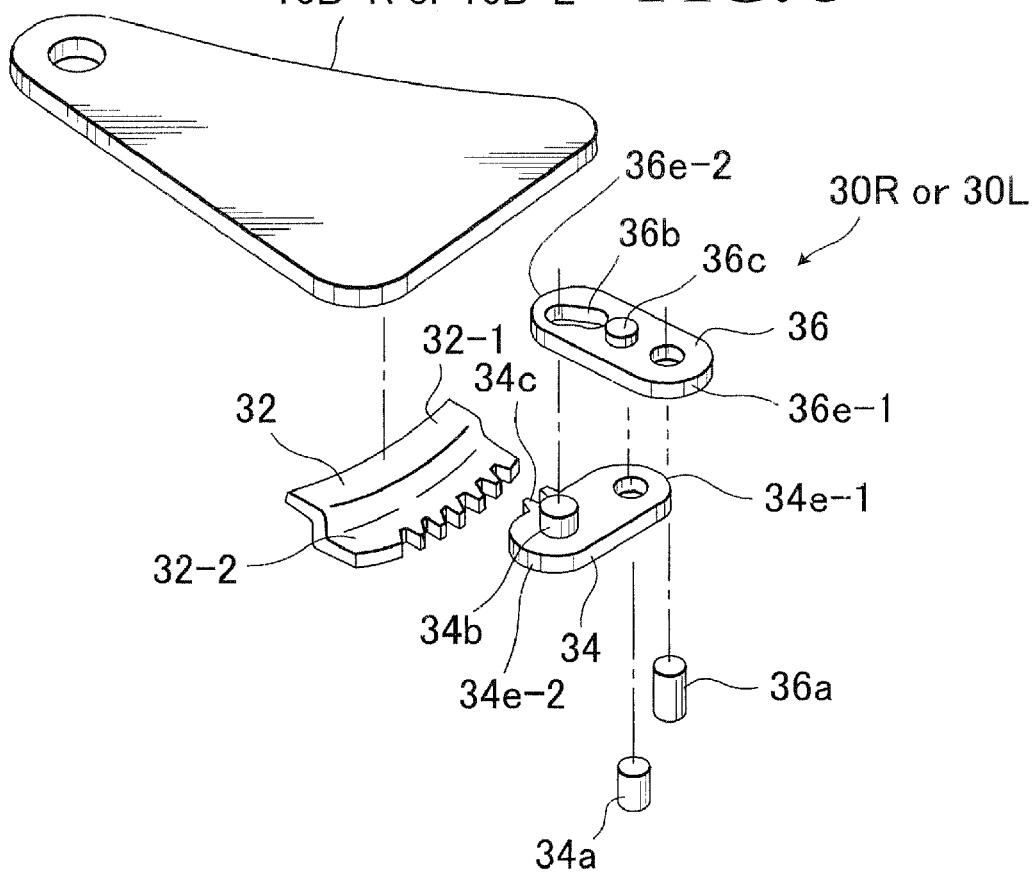
FIG. 3 is an exploded schematic perspective view showing a principal part of a locking mechanism provided in the seat height adjustment mechanism.
Figure 4:
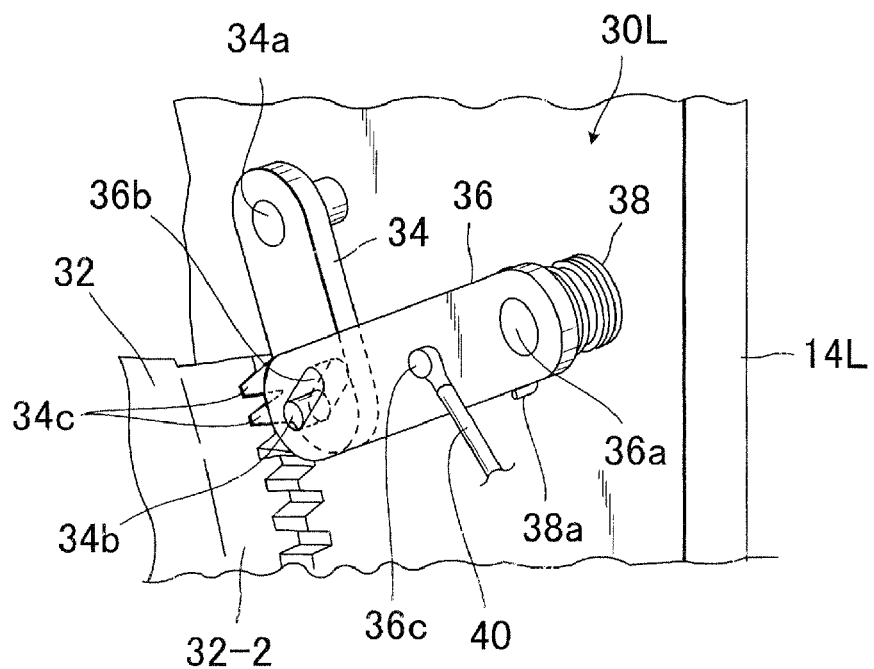
FIG. 4 is a partly broken perspective showing a principal part of the locking mechanism.
Figure 5:
FIG. 5(A) is a front view of a torsion coil spring that can be used in the locking mechanism.
FIG. 5(B) is a plan view of the torsion coil spring.
Figure 5:
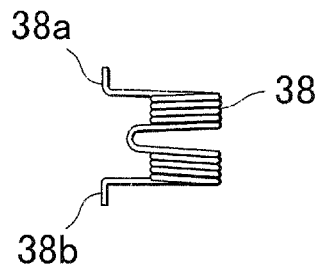

As shown in FIGS. 3, 4 and 9(A), each of the two locking mechanisms (30L) (30R) is comprised of: an actuator link (36); a latch element (34); a gear element (32); and a drawing element (40).

A specific description will be made only of the left-side locking mechanism (30L) for the sake of simplicity, since both left-side and right-side locking mechanisms (30L) (30R) are identical to each other in structure and actions.

Figure 6:
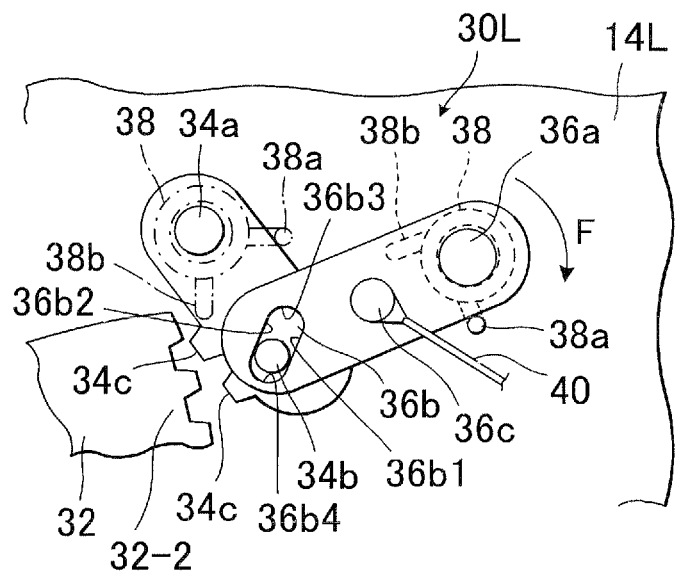
FIG. 6 is a diagram showing how the torsion coil spring is provided to the locking mechanism.

As shown, the actuator link (36) has an elongated guide hole (36b) formed in one end portion (36e-1) thereof. As best seen in FIG. 6, the guide hole (36b) has an upper edge (36b3), a lower edge (36b4), a first lateral edge (36b1), and second lateral edge (36b2). Designation (36c) denotes a connecting pin formed in the intermediate area of the actuator link (36). The connecting pin (36c) is adapted for connection with one end (40E-2) of a transmission element or a wire (40).

The latch element (34) is pivotally connected, at one end portion (34e-1) thereof, with the seat riser member (30L) via a pivot pin (34a). The latch element (34) also has a toothed region (34c) formed in another end portion (34e-2) thereof. Designation (34b) denotes a guide pin (34b) formed in another end portion (34e-2) of the latch element (34). The gear element (32) is fixedly connected at the securing region (32-1) thereof with the backward link member (16B-L) and has a toothed region (32-2) formed in another end portion (34e-2) thereof.

As will be described, the toothed region (34c) of latch element (34) may be meshed partway with the toothed region (32-2) for the purpose of locking the backward link member (16B-R or 16B-L).

The actuator link (36) is pivotally connected, at another end portion (36e-1) thereof, with the seat riser member (14L) via a pivot pin (36a). As shown, the guide pin (34b) of the latch element (34) is slidably engaged in the guide hole (36b) of the actuator link (36).

As shown in FIG. 9(A), a transmission element (40), preferably a wire, is operatively extended between a backward end portion (22a) of the operating lever (22) and the connecting pin (36c) of the actuator link (36). More specifically, one end potion (at 40E-1) of the wire (40) is slidably secured by a securing member (40a) in the vicinity of the operating lever (22), while another end portion (at 40E-2) of the wire (40) slidably secured by a securing member (40a) in the vicinity of the locking mechanism (30L). Further, one distal end (40E-1) of the wire (40) is fixedly connected with the backward end portion (22a) of operating lever (22), and another distal end (40E-1) of the wire (40) fixedly connected with the pin (38a) of actuator link (36).

With the above-described arrangement, it is seen that the ratchet-type drive mechanism (20) is operatively connected, at the driving shaft or axis (01) thereof, with both left-side forward and backward link members (16F-L) (16B-L) via the pinion gear (26), sector gear (28) and connecting link (29), while being on the other hand operatively connected via the wire (40) with the locking mechanism (30L), at the backward end portion (at 22a) thereof.

Designations (38) and (38') commonly stand for a biasing element adapted for biasingly causing the latch element (34) to rotate clockwise, as indicated by arrow (F), so that the toothed region (34c) of latch element (34) is normally retained in mesh with the toothed region (32-2) of gear element (32).

With regard to such biasing element, for example, a torsion coil spring (38) shown in FIGS. 5(A) and 5(B) may be used. As seen from FIG. 4 and as indicated by the dotted line in FIG. 6, the torsion coil spring (38) may be wound about the pivot pin (36a) associated with the actuator link (36), such that one end (38a) thereof is securely connected with the lower edge of the actuator link (36) and another end (38b) thereof is fixedly connected with the seat riser member (14L). Alternatively, as indicated by the one-dot chain line in FIG. 6, the torsion coil spring (38) may be wound about the pivot pin (34a) associated with the latch element (34), such that one end (38a) thereof is securely connected with one lateral edge of the latch element (34) and another end (38b) thereof is fixedly connected with the seat riser member (14L).

Figure 7:
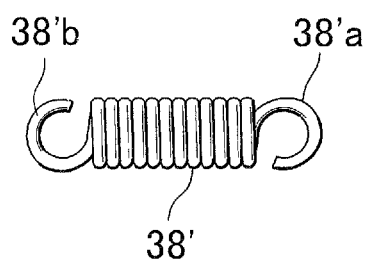
FIG. 7 is a front view of an extension coil spring that can be used in the locking mechanism.
Figure 8:
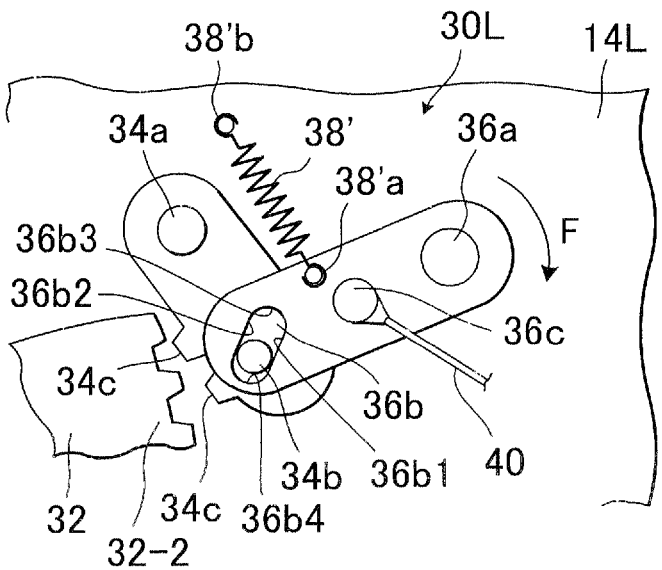
FIG. 8 is a diagram showing how the extension coil spring is provided to the locking mechanism.
Figure 9:
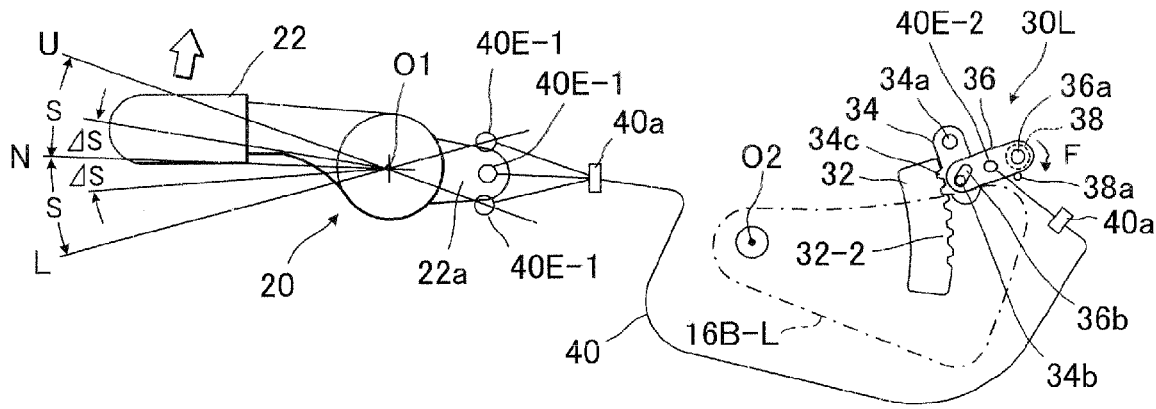
FIG. 9(A) is a schematic diagram which explanatorily shows an operative relation between an operating lever and the locking mechanism.
FIG. 9(B) is a schematic diagram which explanatorily shows action of the locking mechanism when the operating lever is rotated upwardly during an idle stroke.
FIG. 9(C) is a schematic diagram which explanatorily shows action of the locking mechanism when the operating lever is rotated further upwardly beyond the idle stroke.
Figure 9:
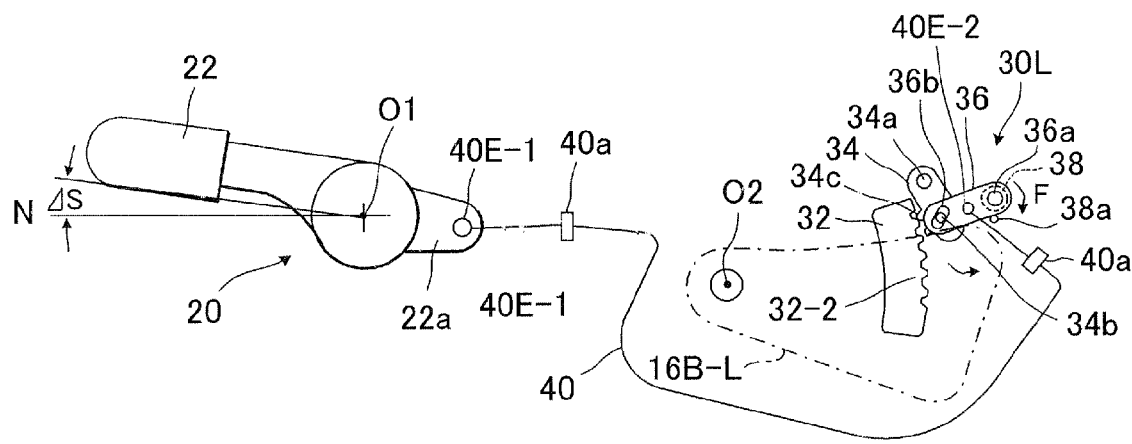
Figure 9:
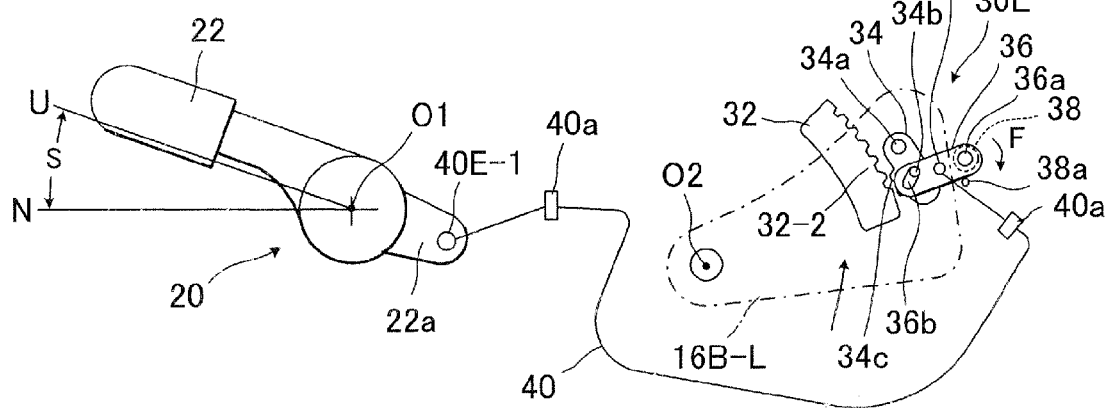

Or, alternatively, as suggested in FIGS. 7 and 8, an extension coil spring (38') may be used as the foregoing biasing element. In that case, as in FIG. 8, the extension coil spring (38') may be securely connected at one end thereof (38'a) with the actuator link (38) and be securely connected at another end thereof (38'b) with the seat riser member (14L). In this respect, in place of the extension coil spring (38'), a suitable form of compression coil spring may be used.

Now, a description will be made of how the above-constructed seat height adjustment mechanism (10) is operated.

At first, let us assume that the vehicle seat is set at a lowest home position, as shown in FIG. 1. Under such state, as seen in FIG. 9(A), the toothed region (34c) of latch element (34) is normally retained in mesh with an uppermost part of the toothed region (32-2) of gear element (32) under the biasing force (at F) of the previously stated biasing element (38 or 38'). Further, by the virtue of such biasing force, it is seen that the operating lever (22) is normally retained at a neutral inoperative position (N), and also, the guide pin (34b), slidably fitted in the guide hole (36b), is retained in contact with the lower edge (36b4) of that particular guide hole (36b) as well as with the two lateral edges (36b1) (36b2) of the same (36b). This arrangement in effect prevents the latch element (34) against disengagement from the gear element (32), thereby insuring to lock the backward link member (16B-L) against movement.

When it is desired to raise the seat upwardly, the operating lever (22) is rotated upwardly relative to the axis of driving shaft (at 01), as indicated by the upward arrow in FIG. 9(A), against the biasing force (at F) of the biasing element (at 38). At this moment, within the range of the idle stroke (⊿S), the driving shaft (at 01) is not rotated, but, as understandable from FIG. 9(B), the backward end portion (22a) of operating lever (22) is rotated clockwise relative to the axis (01), thereby drawing the wire (40) towards the side where that particular operating lever (22) lies, which in turn causes anticlockwise rotation of the actuator link (36) relative to the pivot pin (36a) against the biasing force of biasing element (at 38). With such rotation of actuator link (36), the guide pin (34b) is slidingly moved in and along the guide hole (36b) upwardly. Precisely stated, the guide pin (34b) moves upwardly from the lower edge (36b4) of the guide hole (36b), while being in a pressed and sliding contact with the second lateral edge (36b2) of that particular guide hole (36b). With that sliding movement of guide pin (34b), the latch element (34) is simultaneously rotated anticlockwise relative to the pivot pin (34a), so that the toothed region (34c) thereof is disengaged from the toothed region (32-2) of the gear element (32).

Accordingly, it is appreciated that, when the operating lever (22) is rotated within the range of idle stroke (⊿S), the backward link member (16B-L) is released from the state locked by the locking mechanism (30L) and thus free to rotate relative to the axis (02).

Then, by continuing on to rotate the operating lever (22) upwardly beyond such idle stroke (⊿S) toward the upper limit (U), the driving shaft (at 01) of the operating lever (22) or the pinion gear (26) starts to be rotated clockwise to cause anticlockwise rotation of the sector gears (26) (28), thus causing forward movement of the connecting link (29). Simultaneous therewith, the wire (40) is further drawn towards the operating lever (22) to cause further anticlockwise rotation of the actuator link (36) relative to the pivot pin (36a). With such actions, the guide pin (34b) of the latch element (34) continues to slidingly move upwards in and along the guide hole (36b), while being in a pressed and sliding contact on and along the second lateral edge (36b2) of the guide hole (36b), and is brought to contact with the upper edge (36b3) of that particular guide hole (36b), as understandable from FIG. 9(C) Hence, as long as the operating lever (22) is rotated upwardly, the toothed region (34c) of the latch element (34) is kept disengaged from the toothed region (32-2) of gear element (32), thus retaining the backward link member (16B-L) in unlocked state. Accordingly, with the upward rotation of the operating lever (22), the backward link member (16B-L) is rotated anticlockwise or upwardly relative to the axis (02), while at the same time, the forward link member (16F-L) is likewise rotated anticlockwise or upwardly relative to the axis of the connecting rod (18F), whereupon the vehicle seat is displaced upwardly as indicated by the two-dot chain lines in FIG. 2.

Of course, upon releasing the operating lever (22), due to the biasing force of biasing element (at 38), the wire (40) is quickly drawn toward the locking mechanism (30L), causing the operating lever (22) to rotate about the axis (01) back to the neutral position (N), while at the same time, the actuator link (34) is rotated clockwise relative to the pivot pin (36a), so that the guide pin (34b) thereof slides downwards in and along the guide hole (36b) from the upper edge (36b3) of that particular guide hole (36), while being in a pressed and sliding contact on and along the first lateral edge (36b1) of the guide hole (36). Accordingly, the latch element (34) is rotated clockwise relative to the pivot pin (34a) towards the gear element (32), whereon the toothed region (34c) thereof is engaged partway with the toothed region (32-2) of latch element (32) and therefore the backward link member (16B-L) is locked and retained at a given level against rotation. In that way, the vehicle seat may be set to a desired height by the above-described operation of the seat height adjustment mechanism (10).

In this respect, it is to be noted that the above-described upward rotation and releasing of the operating lever (22) will have to be repeated, if it is desired to raise the seat to a desired level. In other words, a required plural number of strokes (S) above the neutral position (N) are required for the operating lever (22) in order to cause continued upward rotation of the backward link member (16B-L) so that the seat may be raised to a desired level or height. Hence, during such plural number of strokes (S) of the operating lever (22), corresponding plural number of idle strokes (⊿S) naturally occurs, so that, each time the operating lever (22) is rotated upwardly from the neutral position (N), the above-described unlocking operation of locking mechanism (30L) (i.e. disengagement of the latch element (34) from the gear element (32)) is effected within the range of the idle stroke (∠S) prior to rotation of the driving shaft (at 01).

Referring again to FIG. 9(A), the operating lever (22) may also be rotated downwardly from the neutral position (N) toward the lower limit (L). Even in that case, there is an idle stroke (∠S) of the operating lever (22), which is identical to the above-discussed idle stroke (∠S). It is noted here that this downward rotation of operating lever (22) is limited to the case where the seat must be lowered from a high level (as indicated by the two-dot chain lines in FIG. 2) towards a home position (as indicated by the one-dot chain lines in FIG. 2).

In the present case also, as the operating lever (22) is rotated downwards within the range of the idle stroke (∠S), the driving shaft (at 01) thereof is not rotated, and only the locking mechanism (30L) operates in exactly the same way as described previously to unlock the backward link member (16B-L). Namely, in brief, as understandable from FIG. 9 (A) to FIG. 9(B), the actuator link (36) is rotated anticlockwise against the biasing force (at F), and at the same time, the latch element (34) is rotated anticlockwise due to upward sliding movement of the guide pin (34b) along the guide hole (36b), which results in disengagement of the latch element toothed region (34c) from the gear element toothed region (32-2) so as to unlock the backward link member (16B-L) and allow the same to be free to rotate relative to the axis (02). Then, by continuing downward rotation of the operating lever (22) beyond the idle stroke (∠S), the driving shaft (at 01) is rotated anticlockwise, which results in backward movement of the connecting link (29), thereby causing the backward link member (16B-L) to rotate clockwise or downwardly relative to the axis (02), while simultaneously, the forward link member (16F-L) is rotated in the likewise clockwise or downward direction relative to the axis of the connecting rod (18F). Thus, the seat is lowered.

According to the illustrated locking mechanism (30L), the latch element toothed region (34c) is completely in mesh with a local part of the gear element toothed region (32-2), which means that the backward link member (16B-L) are assuredly locked against movement and protected against deformation, irrespective of whether a forward or backward excessive great load is applied thereto. Thus, as far as the present embodiment is concerned, the backward link member (16B-L) is protected against deformation in any of rear-end collision and head-on collision.

Instead of such embodiment, the latch and gear elements (34) (32) may be of such a ratchet structure wherein, when the backward link member (16B-L) is rotated in one of downward direction and upward direction, the toothed region (34c) of the latch element (34) is permitted to disengage the toothed region (32-2) of the gear element (32). In that particular mode, preferably, the latch element (34) and gear element (32) may be modified into a ratchet pawl and a ratchet gear, respectively, in a proper manner. In particular, the latch and gear elements (34) (32) may be of the ratchet structure wherein, the latch element toothed region (34c) (preferably, one ratchet pawl) is normally partway meshed with the gear element toothed region (32-2) under a biasing force (F) of the biasing element (at 38), while being permitted to disengage or slidingly ride over the gear element toothed region (32-2) only when the backward link member (16B-L) is rotated in the anticlockwise or upward direction relative to the axis (02) away from the base member (14L). This arrangement is only effective in the case of rear-end collision. Specifically stated, when the rear-end collision occurs, a backward and downward excessive great load is applied from a seat occupant to the backward link member (16B-L), and at that time, the backward link member (16B-L) is about to rotate clockwise or downwardly relative to the axis (02) due to that particular excessive great load. But, in this particular alternative embodiment, the latch element toothed region (34c) (as a ratchet pawl) has been engaged with the gear element toothed region (32-2) (as a ratchet gear), thereby withstanding such excessive backward load and insuring to lock the backward link member (16B-L) against rotation. Thus, such ratchet locking mechanism also prevents the backward link member (16B-L) against deformation. Of course, in the present alternative embodiment, likewise as in the foregoing embodiment, the actuator link (36) may be operatively connected with the latch element (34), such that a guide pin (34b) fixed on that latch element (34) is slidably engaged in a guide hole (36b) formed in the actuator link (36) and that a wire (40) is extended between the actuator link (36) and the operating lever (22). Thus, rotation of the operating lever (22) causes anticlockwise rotation of the actuator link (36), which results in the latch element (34) being disengaged from the gear element (32) due to the guide pin (34b) sliding upwardly in and along the guide hole (36b), so that the backward link member (16B-L) is unlocked and free to rotate relative to the axis (02).

From the description above, in accordance with the present invention, the following advantages are achieved:

(i) The latch element (34) is retained in meshed engagement with the gear element (32) under the biasing force (at F) as far as the operating lever (22) is set at the neutral position (N), which insures that both two backward link members (16B-L) (16B-R) are always in a locked state and retained against rotation. Thus, the seat height adjustment mechanism (10) is not influenced by a degree of backward inertia of a seat occupant in the case of rear-end collision, as found in the prior art. Further, due to such locked effect, the backward link members are positively reinforced and prevented against deformation by an excessive backward load applied thereto in the case of rear-end collision, so that the seat height adjustment mechanism (10) is in no way subjected to twisting and downward deformation due to the rear-end collision, as found in the prior art.

(ii) In view of (i) above, both of the two backward link members (16B-L) (16B-R) are always in a reinforced state and not deformable by the excessive load applied thereto, and therefore, there is no need to increase the thickness of each of the two backward link members (16B-L) (16B-R), which effectively avoids increase of weights and costs of the seat height adjustment mechanism (10) on the whole.

While having described the present invention thus far, it should be understood that the invention is not limited to the illustrated embodiment, and any other modification, replacement and addition may be applied thereto without departing from the scopes of the appended claims.

What is claimed is:

1. A height adjustment mechanism provided in a vehicle seat including a seat cushion frame and a base member, wherein said seat cushion frame has a forward region facing forwardly of said vehicle seat and a rear region facing rearwardly of the vehicle seat, and said base member also has a forward region facing forwardly of said vehicle seat and a rear region facing rearwardly of the vehicle seat, said height adjustment mechanism comprising:
   a forward link element pivotally connected between said forward region of said seat cushion frame and said forward region of said base member;
   a backward link element pivotally connected between said rear region of said seat cushion frame and said rear region of said base member;

a ratchet-type drive means operatively connected with said rear link element and operable to cause vertical rotation of said rear link element towards and away from said base member, said ratchet-type drive means including an operating lever normally set at a neutral operative position, said operating lever being movable in one of a first direction and a second direction relative to said neutral inoperative position to thereby cause said vertical rotation of said rear link element;

said ratchet-type drive means being of a type having an inoperative stroke ($\triangle S$) in one stroke of said operating level in said one of said first and second directions, and, during said inoperative stroke ($\triangle S$), movement of said operating lever in either of said first and second directions is inoperative to said ratchet-type drive means; and a locking mechanism including:

a gear element fixed to said backward link element;

a latch element rotatably connected with said base member;

an actuator link rotatably connected with said base member; said actuator link having an operative connection with said latch element, and also having an operative connection with said operating level via a transmission element; and a biasing means for biasing said latch element to meshed engagement with said gear element, thereby normally locking and retaining said backward link element against rotation, with such an arrangement that, when the operating lever is moved in said one of said first and second directions during said inoperative stroke ($\triangle S$), a corresponding force of said operating lever is transmitted by said transmission element to said actuator link which is in turn rotated to cause simultaneous rotation of said latch element, so that said latch element is disengaged from said gear element during said inoperative stroke ($\triangle S$), thereby placing said rear link member in unlocked state.

2. The height adjustment mechanism as claimed in claim 1, wherein one of said latch element and said actuator link has a guide pin fixedly provided therein, whereas other of said latch element and said actuator link has a guide hole formed therein, and wherein said guide pin is slidably inserted in said guide hole, thereby establishing said operative connection between said latch element and said actuator link.

3. The height adjustment mechanism as claimed in claim 1, wherein said base member comprises a seat riser member, and wherein said transmission element comprises a wire operatively connected between said operating lever and said actuator link.

4. The height adjustment mechanism as claimed in claim 1, wherein said biasing means is engaged to said actuator link, such that said actuator link is resiliently biased by said biasing means so as to cause meshed engagement of said latch element with said gear element.

5. The height adjustment mechanism as claimed in claim 1, wherein said actuator link is rotatably connected via a pivot pin with said base member, wherein said biasing means comprises a torsion spring wound about said pivot pin, such that said actuator link is biased by said torsion spring to rotate relative to said pivot pin in a direction to cause said latch element to be normally in meshed engagement with said gear element.

6. The height adjustment mechanism as claimed in claim 1, wherein said biasing means is engaged to said latch element, such that said latch element is resiliently biased by said biasing means to meshed engagement with said gear element.

7. The height adjustment mechanism as claimed in claim 1, wherein said latch element is rotatably connected via a pivot pin with said base member, wherein said biasing means comprises a torsion spring wound about said pivot pin, and wherein said latch element is biased by said torsion spring to rotate relative to said pivot so as to be normally in meshed engagement with said gear element.

8. The height adjustment mechanism as claimed in claim 1, wherein said latch element and said gear element are arranged in a ratchet manner, such that said latch element is normally in meshed engagement with said gear element under a biasing force of said biasing means, while being only permitted to be disengaged from said gear element when said rear link member is rotated upwardly away from said base member, whereby said rear link member is normally locked and prevented against downward rotation toward said base member.

* * * * *